(12) United States Patent
Görich et al.

(10) Patent No.: US 11,653,752 B2
(45) Date of Patent: May 23, 2023

(54) ORAL CARE IMPLEMENT

(71) Applicant: The Gillette Company LLC, Boston, MA (US)

(72) Inventors: Gerald Görich, Weiterstadt (DE); Markus Morgott, Eschborn (DE); Uwe Jungnickel, Königstein (DE)

(73) Assignee: The Gillette Company, LLC., Boston, MA (US)

( * ) Notice: Subject to any disclaimer, the term of this patent is extended or adjusted under 35 U.S.C. 154(b) by 227 days.

(21) Appl. No.: 17/077,639

(22) Filed: Oct. 22, 2020

(65) Prior Publication Data

US 2021/0120948 A1 Apr. 29, 2021

Related U.S. Application Data

(63) Continuation of application No. 16/225,509, filed on Dec. 19, 2018, now Pat. No. 10,842,255.

(30) Foreign Application Priority Data

Dec. 20, 2017 (EP) ..................................... 17208954

(51) Int. Cl.
| | | |
|---|---|---|
| *A46D 3/00* | (2006.01) | |
| *A46B 5/02* | (2006.01) | |
| *A46B 5/00* | (2006.01) | |
| *A46B 9/04* | (2006.01) | |
| *B29C 45/14* | (2006.01) | |
| *B29L 31/42* | (2006.01) | |

(52) U.S. Cl.
CPC ............ *A46D 3/005* (2013.01); *A46B 5/0095* (2013.01); *A46B 5/02* (2013.01); *A46B 9/04* (2013.01); *B29C 45/14385* (2013.01); *A46B 2200/1066* (2013.01); *B29L 2031/425* (2013.01)

(58) Field of Classification Search
CPC ........ A46D 3/005; A46B 5/0095; A46B 5/02; A46B 9/04; B29C 45/14385
See application file for complete search history.

(56) References Cited

U.S. PATENT DOCUMENTS

| | | |
|---|---|---|
| 3,103,680 A | 9/1963 | Abraham |
| 3,927,435 A | 12/1975 | Moret |
| 4,384,645 A | 5/1983 | Manfredi |

(Continued)

FOREIGN PATENT DOCUMENTS

| | | |
|---|---|---|
| CN | 2320102 | 5/1999 |
| CN | 1223834 | 7/1999 |

(Continued)

OTHER PUBLICATIONS

U.S. Appl. No. 29/819,318, filed Dec. 14, 2021, Devran Albay et al.

(Continued)

*Primary Examiner* — Shay Karls
(74) *Attorney, Agent, or Firm* — Vladimir Vitenberg; Gregory S. Darley-Emerson

(57) ABSTRACT

An oral care implement comprises a head and a handle, the head being repeatedly attachable to and detachable from the handle. The head is made from a non-magnetic and/or non-ferromagnetic material, while the handle is at least partially made from a magnetic and/or ferromagnetic material.

10 Claims, 4 Drawing Sheets

(56) References Cited

U.S. PATENT DOCUMENTS

| | | | |
|---|---|---|---|
| 4,811,445 A | 3/1989 | Lagieski | |
| 5,109,563 A | 5/1992 | Lemon et al. | |
| 5,335,389 A | 8/1994 | Curtis et al. | |
| 5,361,446 A | 11/1994 | Rufo | |
| 5,369,835 A | 12/1994 | Clarke | |
| 5,875,510 A | 3/1999 | Lamond et al. | |
| 5,956,796 A | 9/1999 | Lodato | |
| 5,992,423 A | 11/1999 | Tevolini | |
| 6,015,328 A | 1/2000 | Glaser | |
| 6,086,373 A | 7/2000 | Schiff | |
| 6,230,716 B1 | 5/2001 | Minoletti | |
| 6,308,367 B1 | 10/2001 | Beals et al. | |
| 6,643,886 B2 | 11/2003 | Moskovich | |
| 6,671,919 B2 | 1/2004 | Davis | |
| 6,871,373 B2 | 3/2005 | Driesen | |
| 7,137,166 B1 | 11/2006 | Kraemer | |
| 8,387,197 B2 | 3/2013 | Moskovich | |
| 8,563,020 B2 | 10/2013 | Uhlmann | |
| 8,727,141 B2 * | 5/2014 | Akalin | A46B 17/02 211/DIG. 1 |
| 8,931,855 B1 | 1/2015 | Foley et al. | |
| 8,966,697 B2 | 3/2015 | Kim et al. | |
| 9,049,921 B1 | 6/2015 | Rackston | |
| 9,066,579 B2 | 6/2015 | Hess | |
| 9,161,544 B2 | 10/2015 | Agrawal et al. | |
| 9,168,117 B2 | 10/2015 | Yoshida et al. | |
| 9,226,508 B2 | 1/2016 | Uhlmann et al. | |
| 9,265,335 B2 | 2/2016 | Foley et al. | |
| 9,402,461 B2 | 8/2016 | Brik et al. | |
| 9,427,077 B1 | 8/2016 | Zhang | |
| D775,469 S | 1/2017 | Sikora et al. | |
| 9,539,750 B2 | 1/2017 | Gross et al. | |
| 9,609,940 B2 | 4/2017 | Corbett | |
| 9,642,682 B2 | 5/2017 | Kato | |
| D814,195 S | 4/2018 | Sikora et al. | |
| 10,195,005 B2 | 2/2019 | Wallström et al. | |
| 10,667,892 B2 | 6/2020 | Bärtschi et al. | |
| 10,792,136 B2 | 10/2020 | May et al. | |
| D901,183 S | 11/2020 | Jungnickel et al. | |
| D912,988 S | 3/2021 | Langhammer | |
| D917,298 S | 4/2021 | Hallein et al. | |
| D926,048 S | 7/2021 | Hallein et al. | |
| D926,049 S | 7/2021 | Hallein et al. | |
| D927,972 S | 8/2021 | Hallein et al. | |
| D930,990 S | 9/2021 | Hallein et al. | |
| D931,617 S | 9/2021 | Hallein et al. | |
| D931,619 S | 9/2021 | Hallein et al. | |
| D933,368 S | 10/2021 | Albay et al. | |
| D936,484 S | 11/2021 | Hallein et al. | |
| 2003/0115706 A1 | 6/2003 | Ponzini | |
| 2004/0016073 A1 | 1/2004 | Knutson | |
| 2004/0060138 A1 | 4/2004 | Pfenniger et al. | |
| 2005/0022322 A1 | 2/2005 | Jimenez et al. | |
| 2005/0268414 A1 | 12/2005 | Kim | |
| 2005/0286967 A1 | 12/2005 | Blauzdys | |
| 2006/0086370 A1 | 4/2006 | Omeara | |
| 2008/0120795 A1 | 5/2008 | Reinbold | |
| 2008/0220235 A1 | 9/2008 | Izumi | |
| 2009/0089950 A1 | 4/2009 | Moskovich et al. | |
| 2010/0115724 A1 | 5/2010 | Huang | |
| 2010/0282274 A1 | 11/2010 | Huy | |
| 2011/0016651 A1 | 1/2011 | Piserchio | |
| 2011/0146015 A1 * | 6/2011 | Moskovich | B29C 45/14344 15/167.1 |
| 2011/0314677 A1 | 12/2011 | Meier et al. | |
| 2012/0036663 A1 | 2/2012 | Chen | |
| 2012/0073072 A1 | 3/2012 | Moskovich et al. | |
| 2012/0090117 A1 | 4/2012 | Akalin | |
| 2012/0198640 A1 | 8/2012 | Jungnickel et al. | |
| 2012/0227200 A1 | 9/2012 | Kraemer | |
| 2012/0301528 A1 | 11/2012 | Uhlmann | |
| 2012/0301530 A1 | 11/2012 | Uhlmann et al. | |
| 2012/0301531 A1 | 11/2012 | Uhlmann et al. | |
| 2012/0301533 A1 | 11/2012 | Uhlmann et al. | |
| 2013/0000059 A1 | 1/2013 | Jungnickel et al. | |
| 2013/0171225 A1 | 7/2013 | Uhlmann et al. | |
| 2013/0291326 A1 | 11/2013 | Mintel | |
| 2013/0315972 A1 | 11/2013 | Krasnow et al. | |
| 2014/0137349 A1 | 5/2014 | Newman | |
| 2014/0259474 A1 | 9/2014 | Sokol et al. | |
| 2014/0359957 A1 | 12/2014 | Jungnickel | |
| 2014/0359958 A1 | 12/2014 | Jungnickel | |
| 2015/0034858 A1 | 2/2015 | Raman | |
| 2015/0143651 A1 | 5/2015 | Foley et al. | |
| 2015/0147372 A1 | 5/2015 | Agrawal et al. | |
| 2015/0245618 A9 | 9/2015 | Agrawal et al. | |
| 2015/0289635 A1 | 10/2015 | Erskine-Smith | |
| 2015/0305487 A1 | 10/2015 | Pardo et al. | |
| 2015/0351406 A1 | 12/2015 | Wingfield et al. | |
| 2016/0135579 A1 | 5/2016 | Tschol et al. | |
| 2016/0135580 A1 | 5/2016 | Tschol et al. | |
| 2016/0220014 A1 | 8/2016 | Sprosta | |
| 2017/0079418 A1 | 3/2017 | Mintel | |
| 2017/0347782 A1 | 12/2017 | Jimenez et al. | |
| 2017/0347786 A1 | 12/2017 | Jimenez et al. | |
| 2017/0367469 A1 | 12/2017 | Jimenez et al. | |
| 2018/0016408 A1 * | 1/2018 | Stibor | B29C 48/022 |
| 2018/0055206 A1 | 3/2018 | Nelson et al. | |
| 2018/0311023 A1 | 11/2018 | Yao | |
| 2019/0000223 A1 | 1/2019 | Alinski | |
| 2019/0069978 A1 | 3/2019 | Katano et al. | |
| 2019/0104835 A1 | 4/2019 | Alinski | |
| 2019/0117356 A1 | 4/2019 | Bärtschi et al. | |
| 2019/0175320 A1 | 6/2019 | Bloch et al. | |
| 2019/0200740 A1 | 7/2019 | Jungnickel | |
| 2019/0200742 A1 | 7/2019 | Jungnickel | |
| 2019/0200743 A1 | 7/2019 | Jungnickel | |
| 2019/0200748 A1 | 7/2019 | Görich et al. | |
| 2019/0246779 A1 | 8/2019 | Jungnickel et al. | |
| 2019/0246780 A1 | 8/2019 | Jungnickel et al. | |
| 2019/0246781 A1 | 8/2019 | Jungnickel et al. | |
| 2019/0248049 A1 | 8/2019 | Jungnickel et al. | |
| 2020/0022793 A1 | 1/2020 | Scherrer et al. | |
| 2020/0077778 A1 | 3/2020 | Jungnickel | |
| 2020/0121069 A1 | 4/2020 | Jungnickel | |
| 2020/0305588 A1 | 10/2020 | Jungnickel | |
| 2021/0128286 A1 | 5/2021 | Jungnickel et al. | |
| 2021/0212446 A1 | 7/2021 | Jungnickel | |
| 2021/0212447 A1 | 7/2021 | Jungnickel et al. | |
| 2021/0212448 A1 | 7/2021 | Jungnickel | |
| 2021/0220101 A1 | 7/2021 | Jungnickel et al. | |
| 2021/0259818 A1 | 8/2021 | Jungnickel et al. | |
| 2021/0307496 A1 | 10/2021 | Jungnickel et al. | |
| 2021/0315368 A1 | 10/2021 | Jungnickel | |
| 2021/0315369 A1 | 10/2021 | Jungnickel | |
| 2021/0315370 A1 | 10/2021 | Jungnickel | |
| 2021/0315675 A1 | 10/2021 | Jungnickel | |

FOREIGN PATENT DOCUMENTS

| | | |
|---|---|---|
| CN | 1229341 A | 9/1999 |
| CN | 1229622 | 9/1999 |
| CN | 2346277 | 11/1999 |
| CN | 1241123 A | 1/2000 |
| CN | 201036392 | 3/2008 |
| CN | 201185740 | 1/2009 |
| CN | 201563874 U | 9/2010 |
| CN | 201630520 | 11/2010 |
| CN | 201675294 | 12/2010 |
| CN | 201861064 | 6/2011 |
| CN | 201861068 | 6/2011 |
| CN | 202035662 | 11/2011 |
| CN | 202269590 U | 6/2012 |
| CN | 202286879 | 7/2012 |
| CN | 202476817 | 10/2012 |
| CN | 102907880 | 2/2013 |
| CN | 102948997 | 3/2013 |
| CN | 103829559 | 3/2013 |
| CN | 202820100 | 3/2013 |
| CN | 202941615 | 5/2013 |
| CN | 202980745 | 6/2013 |
| CN | 103844575 | 11/2014 |
| CN | 104768420 A | 7/2015 |
| CN | 105054571 | 11/2015 |

(56) References Cited

FOREIGN PATENT DOCUMENTS

| | | |
|---|---|---|
| CN | 205082879 | 3/2016 |
| CN | 105534002 | 5/2016 |
| CN | 105750734 | 7/2016 |
| CN | 105818322 | 8/2016 |
| CN | 205568222 | 9/2016 |
| CN | 106132244 A | 11/2016 |
| CN | 106793866 A | 5/2017 |
| CN | 206714397 | 12/2017 |
| CN | 207055161 | 3/2018 |
| CN | 109259882 A | 1/2019 |
| CN | 111713845 A | 9/2020 |
| DE | 3241118 A1 | 8/1984 |
| DE | 4412301 A1 | 10/1995 |
| DE | 202005002964 | 7/2005 |
| DE | 202006019788 | 8/2007 |
| DE | 102006051649 | 5/2008 |
| DE | 202015002964 U1 | 8/2015 |
| EP | 0100975 A2 | 2/1984 |
| EP | 0481553 A1 | 4/1992 |
| EP | 2117395 A2 | 11/2009 |
| EP | 2218559 A1 | 8/2010 |
| EP | 3090646 | 11/2016 |
| EP | 3381404 A1 | 10/2018 |
| EP | 3501333 | 6/2019 |
| FR | 2835176 | 8/2003 |
| GB | 766486 | 1/1957 |
| GB | 2493409 | 2/2013 |
| JP | 61020509 | 1/1986 |
| JP | S63284262 | 11/1988 |
| JP | H0669408 | 3/1994 |
| JP | 2561978 | 12/1996 |
| JP | 2619825 | 6/1997 |
| JP | H1199016 A | 4/1999 |
| JP | 2002512540 | 4/2002 |
| JP | 2003009951 | 1/2003 |
| JP | 2003245132 | 9/2003 |
| JP | 2004089471 | 3/2004 |
| JP | 2005053973 | 3/2005 |
| JP | 4076405 | 2/2008 |
| JP | 2009011621 | 1/2009 |
| JP | 2011045621 | 3/2011 |
| JP | 2011087747 | 5/2011 |
| JP | 2015231500 A | 12/2015 |
| JP | 6160619 B2 | 6/2017 |
| JP | 3213325 | 11/2017 |
| KR | 20060042059 A | 5/2006 |
| KR | 20070013844 | 1/2007 |
| KR | 20090030829 | 3/2009 |
| KR | 20100043124 A | 4/2010 |
| KR | 101142611 | 5/2012 |
| KR | 20130006243 A | 1/2013 |
| KR | 20130006243 U | 10/2013 |
| KR | 101339558 | 12/2013 |
| KR | 200473116 | 6/2014 |
| KR | 20150057308 | 5/2015 |
| KR | 20150105813 | 9/2015 |
| KR | 101591299 | 2/2016 |
| KR | 20160121554 A | 10/2016 |
| KR | 20160125725 | 11/2016 |
| KR | 20170062779 | 6/2017 |
| KR | 101847473 B1 | 4/2018 |
| KR | 200486759 Y1 | 6/2018 |
| KR | 101987341 B1 | 6/2019 |
| RU | 2141238 | 11/1999 |
| TW | 431151 | 1/2001 |
| WO | 9510959 | 4/1995 |
| WO | 9838889 | 9/1998 |
| WO | 9844823 A2 | 10/1998 |
| WO | 2005002826 A1 | 1/2005 |
| WO | 2005030002 | 4/2005 |
| WO | 200641658 | 4/2006 |
| WO | 2008098107 A2 | 8/2008 |
| WO | 2009045982 A1 | 4/2009 |
| WO | 2012126126 | 9/2012 |
| WO | 2012144328 | 10/2012 |
| WO | 2013076904 | 5/2013 |
| WO | 2013101300 A1 | 7/2013 |
| WO | 2013158741 | 10/2013 |
| WO | 2014193621 | 12/2014 |
| WO | 2015061651 A1 | 4/2015 |
| WO | 2016189407 A1 | 12/2016 |
| WO | 2017173768 A1 | 10/2017 |
| WO | 2018025751 | 2/2018 |
| WO | 2019072925 A1 | 4/2019 |
| WO | 2019157787 A1 | 8/2019 |

OTHER PUBLICATIONS

U.S. Appl. No. 29/814,060, filed Nov. 3, 2021, Christine Hallein et al.
U.S. Appl. No. 29/814,616, filed Nov. 8, 2021, Christine Hallein et al.
International Search Report with Written Opinion dated Jan. 29, 2019, 13 pages.
All Office Actions, U.S. Appl. No. 16/272,392.
All Office Actions, U.S. Appl. No. 16/272,422.
All Office Actions, U.S. Appl. No. 16/272,872.
All Office Actions, U.S. Appl. No. 16/272,943.
All Office Actions; U.S. Appl. No. 16/225,592.
All Office Actions; U.S. Appl. No. 16/225,688.
All Office Actions; U.S. Appl. No. 16/225,809.
All Office Actions; U.S. Appl. No. 16/225,509.
Extended European Search Report and Search Opinion; Application No. 17208870.0; dated Jun. 26, 2018; 8 pages.
Extended European Search Report and Search Opinion; Application No. 17208874.2; dated Feb. 9, 2018; 9 pages.
Extended European Search Report and Search Opinion; Application No. 17208951.8; dated Feb. 19, 2018 ; 6 pages.
Extended European Search Report and Search Opinion; Application No. 17208954.2; dated Feb. 15, 2018; 8 pages.
Extended European Search Report and Search Opinion; Application No. 18155967.5; dated Jul. 20, 2018, 7 pages.
Extended European Search Report and Search Opinion; Application No. 18156005.3; dated Jul. 12, 2018, 8 pages.
Extended European Search Report and Search Opinion; Application No. 18156035.0; dated Aug. 1, 2018, 7 pages.
Extended European Search Report and Search Opinion; Application No. 18156000.4; dated Jul. 20, 2018, 8 pages.
All Office Actions; U.S. Appl. No. 17/511,103, filed Oct. 26, 2021.
All Office Actions; U.S. Appl. No. 17/517,928, filed Nov. 3, 2021.
All Office Actions; U.S. Appl. No. 17/517,937, filed Nov. 3, 2021.
All Office Actions; U.S. Appl. No. 17/517,957, filed Nov. 3, 2021.
All Office Actions; U.S. Appl. No. 17/517,975, filed Nov. 3, 2021.
All Office Actions; U.S. Appl. No. 17/517,990, filed Nov. 3, 2021.
All Office Actions; U.S. Appl. No. 17/517,999, filed Nov. 3, 2021.
All Office Actions; U.S. Appl. No. 17/518,009, filed Nov. 3, 2021.
Unpublished U.S. Appl. No. 17/511,103, filed Oct. 26, 2021, to first inventor et. al.
Unpublished U.S. Appl. No. 17/517,928, filed Nov. 3, 2021, to first inventor et. al.
Unpublished U.S. Appl. No. 17/517,937, filed Nov. 3, 2021, to first inventor et. al.
Unpublished U.S. Appl. No. 17/517,957, filed Nov. 3, 2021, to first inventor et. al.
Unpublished U.S. Appl. No. 17/517,975, filed Nov. 3, 2021, to first inventor et. al.
Unpublished U.S. Appl. No. 17/517,990, filed Nov. 3, 2021, to first inventor et. al.
Unpublished U.S. Appl. No. 17/517,999, filed Nov. 3, 2021, to first inventor et. al.
Unpublished U.S. Appl. No. 17/518,009, filed Nov. 3, 2021, to first inventor et. al.
U.S. Appl. No. 29/746,709, filed Aug. 17, 2020, Christine Hallein et al.
U.S. Appl. No. 29/659,068, filed Aug. 6, 2020, Christine Hallein et al.
U.S. Appl. No. 29/787,707, filed Jun. 8, 2021, Uwe Jungnickel et al.

(56) References Cited

OTHER PUBLICATIONS

U.S. Appl. No. 29/746,718, filed Aug. 17, 2020, Dominik Langhammer.
U.S. Appl. No. 29/757,499, filed Nov. 6, 2020, Christine Hallein et al.
U.S. Appl. No. 29/761,086, filed Dec. 7, 2020, Christine Hallein et al.
U.S. Appl. No. 29/752,903, filed Sep. 29, 2020, Uwe Jungnickel et al.
U.S. Appl. No. 29/752,912, filed Sep. 29, 2020, Uwe Jungnickel et al.
U.S. Appl. No. 29/762,793, filed Dec. 18, 2020, Uwe Jungnickel et al.
U.S. Appl. No. 29/787,712, filed Jun. 8, 2021, Uwe Jungnickel et al.
U.S. Appl. No. 29/699,695, filed Jul. 29, 2019, Niclas Altmann et al.
U.S. Appl. No. 29/743,560, filed Jul. 22, 2020, Devran Albay et al.
U.S. Appl. No. 29/758,268, filed Nov. 13, 2020, Devran Albay et al.
U.S. Appl. No. 29/758,249, filed Nov. 13, 2020, Devran Albay et al.
U.S. Appl. No. 29/758,251, filed Nov. 13, 2020, Devran Albay et al.
U.S. Appl. No. 29/758,276, filed Nov. 13, 2020, Devran Albay et al.
U.S. Appl. No. 29/758,274, filed Nov. 13, 2020, Devran Albay et al.
U.S. Appl. No. 29/786,732, filed Jun. 2, 2021, Devran Albay et al.
U.S. Appl. No. 29/786,746, filed Jun. 2, 2021, Devran Albay et al.
U.S. Appl. No. 29/782,323, filed May 6, 2021, Christine Hallein et al.
International Search Report and Written Opinion; Application Ser. No. PCT/US2018/065317; dated Jan. 29, 2019, 13 pages.
International Search Report and Written Opinion; Application Ser. No. PCT/US2018/065395; dated Mar. 11, 2019, 11 pages.
International Search Report and Written Opinion; Application Ser. No. PCT/US2018/065599; dated Feb. 12, 2019, 15 pages.
International Search Report and Written Opinion; Application Ser. No. PCT/US2018/1065600; dated Feb. 20, 2019, 13 pages.
International Search Report and Written Opinion; Application Ser. No. PCT/US2019/016212; dated May 24, 2019, 10 pages.
International Search Report and Written Opinion; Application Ser. No. PCT/US2019/016214; dated May 29, 2019, 10 pages.
International Search Report and Written Opinion; Application Ser. No. PCT/US2019/016215; dated May 24, 2019, 11 pages.
International Search Report and Written Opinion; Application Ser. No. PCT/US2019/016216; dated Apr. 25, 2019, 8 pages.
CAEtool, Density of Materials, Retrieved from Internet: https://caetool.com/2017/10/12/p0016/, Dec. 12, 2022, 3 pages.
Unpublished U.S. Appl. No. 18/100,730, filed Jan. 24, 2023 to Gerald Gorich et al.
All Office Actions; U.S. Appl. No. 16/551,307, filed Aug. 26, 2019.
All Office Actions; U.S. Appl. No. 16/551,399, filed Aug. 26, 2019.
All Office Actions; U.S. Appl. No. 17/090,980, filed Jun. 11, 2020.
All Office Actions; U.S. Appl. No. 17/155,167, filed Jan. 22, 2021.
All Office Actions; U.S. Appl. No. 17/155,208, filed Jan. 22, 2021.
All Office Actions; U.S. Appl. No. 17/218,573, filed Mar. 31, 2021.
All Office Actions; U.S. Appl. No. 17/218,742, filed Mar. 31, 2021.
All Office Actions; U.S. Appl. No. 17/219,989, filed Apr. 1, 2021.
All Office Actions; U.S. Appl. No. 17/225,259, filed Apr. 8, 2021.
All Office Actions; U.S. Appl. No. 17/225,283, filed Apr. 8, 2021.
All Office Actions; U.S. Appl. No. 17/225,296, filed Apr. 8, 2021.
All Office Actions; U.S. Appl. No. 17/225,411, filed Apr. 8, 2021.
All Office Actions; U.S. Appl. No. 17/354,027, filed Jun. 22, 2021.
All Office Actions; U.S. Appl. No. 17/462,089, filed Aug. 31, 2021.
All Office Actions: U.S. Appl. No. 16/829,585, filed Mar. 25, 2020.
Unpublished U.S. Appl. No. 17/462,089, filed Oct. 31, 2021, to first inventor et. al.

\* cited by examiner

ORAL CARE IMPLEMENT

FIELD OF THE INVENTION

The present disclosure is concerned with an oral care implement comprising a head and a handle, the head being repeatedly attachable to and detachable from the handle, wherein the head and the handle are made from different materials. The present disclosure is further concerned with a method for manufacturing such oral care implement, and a kit comprising such oral care implement and a holder for holding the implement.

BACKGROUND OF THE INVENTION

Heads and handles for oral care implements, like manual toothbrushes, are well known in the art. Generally, tufts of bristles for cleaning teeth are attached to a bristle carrier or mounting surface of a brush head intended for insertion into a user's oral cavity. A handle is usually attached to the head, which handle is held by the user during brushing. Usually, heads of manual toothbrushes are permanently connected to the handle, e.g. by injection molding the bristle carrier, the handle, a neck connecting the head and the handle, in one injection molding step. After the usual lifetime of a toothbrush, i.e. after about three months of usage, the toothbrush is discarded. In order to provide environmentally friendly/sustainable manual toothbrushes generating less waste when the brushes are discarded, manual toothbrushes are known comprising heads or head refills being exchangeable, i.e. repeatedly attachable to and detachable from the handle. Instead of buying a completely new toothbrush, consumers can re-use the handle and buy a new head refill only. Such refills are usually less expensive and generate less waste than a conventional manual toothbrush.

For example, manual toothbrushes are known comprising a handle to which a replaceable head is connected. The handle is provided with a cavity within which the head is insertable. To provide a sufficiently strong connection between the head and the handle, the brush head is formed with a neck having a coupling anchor for engaging in a complementary engaging mechanism within a collar of the handle.

In order to clean teeth effectively, appropriate maneuverability and good handling properties of the overall toothbrush have to be provided, which properties, inter alia, depend on the bending stiffness of the handle and the brush head. Usually handles of toothbrushes have the shape of a linear rod to be handled and manipulated by a user as needed. Since manual toothbrushes with replaceable brush heads comprise an inner cavity within the handle portion to receive the replaceable head, it has been seen that such handles are relatively light, and are, thus, neither comfortable to handle nor easy to maneuver in the oral care cavity. Further, brushes comprising relatively light handles, e.g. handles being made of common plastic materials, e.g. polypropylene, show relatively low bending stiffness, and give users low product quality perception. They tend to flex away easily and the relatively low bending stiffness results in reduced plaque removal efficiency on teeth surfaces. Further, such handles provide poor maneuverability in the mouth during brushing. In order to compensate said low bending stiffness, the size of the cross-sectional area of the handle could be increased. However, relatively thick handles may also reduce ease of rotating the brush in the hand, thus, impeding the user reaching all areas in the oral cavity. Consequently, maneuverability of the overall brush is not sufficient. However, in order to achieve and preserve good oral health, and to prevent gingivitis, it is important to clean teeth and gums thoroughly, in particular in hard to reach areas, e.g. in the region of the back molars. Further, gaps between teeth and periodontium, the so called gingival groove has to be thoroughly cleaned which requires a good and well-coordinated brushing technique, which may not be achievable by using the above-mentioned manual toothbrushes comprising exchangeable heads. Further, it is known that users/consumers use different brushing techniques, and, therefore, it is critical to identify optimal ergonomics of a toothbrush in order to provide good sensory feeling during brushing when using all types of brushing techniques.

Moreover, after use of the brush/after brushing the teeth the user usually stores the wet brush in a toothbrush beaker for drying. However, in a classical toothbrush beaker, drained fluids get collected and accumulated at the bottom of the beaker, and, the fluids stay in contact with the toothbrush for a longer period of time. Since the beaker is open on one side only, the toothbrush dries relatively slowly. Bacteria living in wet conditions/in a wet environment can grow quickly, contaminate the toothbrush and finally render the brush unhygienic. Consequently, there exists a need for a solution for hygienically storing and drying a manual toothbrush, thereby enabling remaining water, toothpaste slurry and saliva to drain off from the brush. The brush shall dry quickly thereby inhibiting bacterial growth.

It is an object of the present disclosure to provide an oral care implement which overcomes at least one of the above-mentioned drawbacks, in particular which provides more comfort and improved maneuverability of the oral care implement in the oral care cavity during brushing, and which enables hygienic storage and drying. It is also an object of the present disclosure to provide a method for manufacturing such oral care implement, and a kit comprising said oral care implement and a holder for holding the implement in a hygienic manner.

SUMMARY OF THE INVENTION

In accordance with one aspect, an oral care implement comprising a head and a handle is provided, the head being repeatedly attachable to and detachable from the handle, the head being made from a non-magnetic and/or non-ferromagnetic material, and the handle being at least partially made from a magnetic and/or ferromagnetic material.

In accordance with one aspect a kit is provided, the kit comprising such oral care implement and a magnetic holder for attaching and holding the oral care implement.

In accordance with one aspect, a method for manufacturing such oral care implement is provided, the method comprising the following steps:

providing an amorphous thermoplastic resin,
providing aluminum oxide, boron nitride or aluminum silicate,
providing iron oxide,
mixing the amorphous thermoplastic resin, aluminum oxide, boron nitride or aluminum silicate and iron oxide into a magnetic and/or ferromagnetic molding material,
heating the molding material mixture into a flowable molding material,
molding the flowable molding mixture into a handle or part of a handle,
providing a non-magnetic and/or non-ferromagnetic material, and molding the non-magnetic and/or non-ferromagnetic material into a head or part of a head.

BRIEF DESCRIPTION OF THE DRAWINGS

The invention is described in more detail below with reference to various embodiments and figures, wherein.

DETAILED DESCRIPTION OF THE INVENTION

Figure 1:
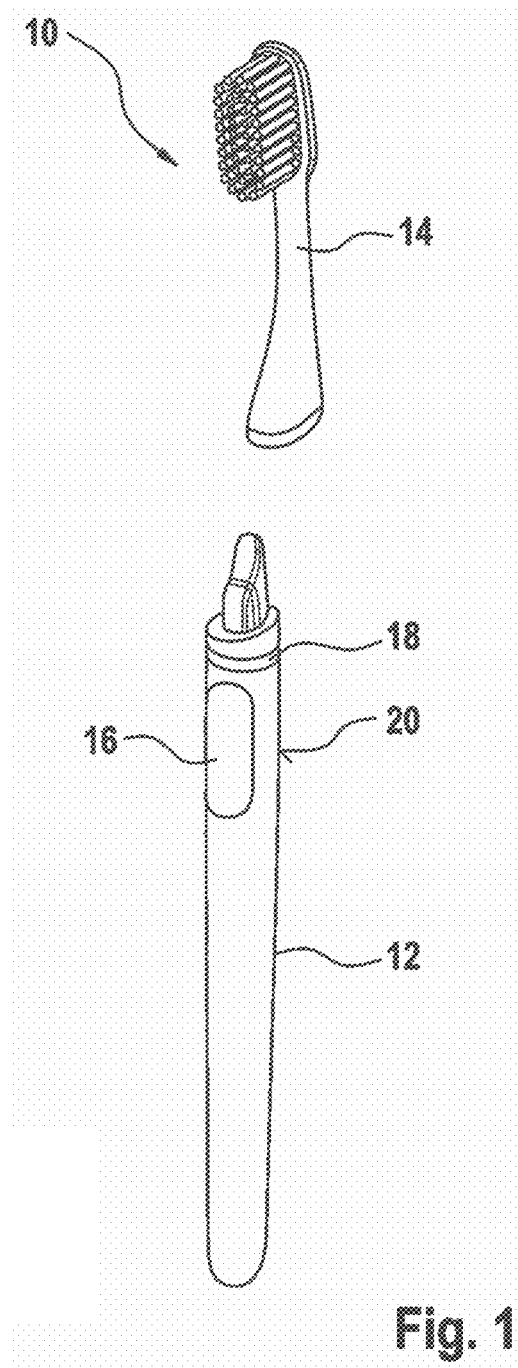
FIG. 1 shows a perspective view of an example embodiment of an oral care implement according to the present disclosure, wherein the head of the oral care implement is detached from the handle.

The oral care implement according to the present disclosure comprises a handle and a head on which at least one tooth cleaning element, e.g. a tuft of bristles and/or an elastomeric element, may be fixed. The head is repeatedly attachable to and detachable from the handle. While the head is made of a non-magnetic or non-ferromagnetic material, the handle is made from a magnetic and/or ferromagnetic material. For example, the head may be injection molded from a thermoplastic polymer, e.g. polypropylene. The oral care implement may be a manual toothbrush. The oral care implement may also be an inter-proximal pick, a plaque scraper or tissue/tongue cleanser. The head of the oral care implement may be attachable to the handle via a snap-fit locking mechanism. For example, the handle may comprise a connector which may be insertable into a hollow portion in the head, or the head may comprise a connector inserable into a hollow portion in the handle. Alternatively, a connector may be provided as a further, i.e. separate part of the oral care implement. Such connector may be insertable into a hollow portion in the handle and into a hollow portion in the head, respectively, thereby providing a sufficiently strong connection and stability between the head and the handle to enable a user to perform a brushing action.

Usually users are accustomed that products, in particular in the personal health care sector, have a specific weight that guarantees high product quality and provides comfortable feeling during use of the product. The magnetic/ferromagnetic material of the handle possesses a relatively high density, and, thus, a relatively heavy weight, which provides the oral care implement with such benefits. Additionally, the magnetic/ferromagnetic material of the handle may have a higher density as the non-magnetic/ferromagnetic material of the head. Consequently, the center of mass lies within the handle which enables users to perform a well-coordinated brushing technique with improved sensory feeling during brushing.

While the high quality and relatively expensive handle of the oral care implement is adapted for usage over a longer period of time as compared to common manual toothbrushes which are discarded after about three months of use, the relatively cheap brush refill can be exchanged on a regular basis, e.g. after about three months. This provides a cost-efficient and environmentally sustainable oral care implement providing both, a high quality handle with improved handling properties, and a solution for only purchasing a new brush head refill without the need to buy a respective handle, too.

Moreover, the magnetic/ferromagnetic material of the handle allows for hygienic storage of the oral care implement. For example, the oral care implement can be magnetically attached to a magnetic holder. Remaining water, toothpaste slurry and saliva can drain off from the brush. The oral care implement can dry relatively quickly. Consequently, bacteria growth can significantly be reduced, thereby rendering the oral care implement more hygienic. In contrast to a common toothbrush being stored in a toothbrush beaker where drained fluids get collected and accumulated at the bottom of the beaker, the brush according to the present disclosure is exposed to wet conditions over a significantly shorter period of time.

A kit according to the present disclosure comprises an oral care implement according to the present disclosure and a magnetic holder for attaching and holding said oral care implement. The magnetic holder may have the form of a flat disk attachable to a wall. Such flat disk may represent an easy to clean surface. Further, a user just needs to bring the oral care implement in close proximity to the magnetic holder, and then the oral care implement gets attached automatically. No precise positioning or threading as with common toothbrush holders is required. Since the magnetic properties are merely provided in the handle, and not in the head, the head portion cannot accidentally be attached to the magnetic holder, thereby reducing the risk that the magnetic holder gets soiled.

The magnetic and/or ferromagnetic material forming at least a part of the handle may comprise an amorphous thermoplastic resin. The magnetic and/or ferromagnetic material may further comprise aluminum oxide, boron nitride or aluminum silicate. Furthermore, the magnetic and/or ferromagnetic material may comprise in addition or alternatively iron oxide. The magnetic and/or ferromagnetic material may further comprise glass fibers which may be pre-mixed with at least a portion of the amorphous thermoplastic resin.

The magnetic/ferromagnetic material allows for control of the weight of the handle in whatever location, e.g. by filler variation. Control of the overall toothbrush is required due to the relatively high weight of the handle. It is now possible to use the mass/weight distribution of the material for adaption of the inertial moment of the finished toothbrush.

The magnetic and/or ferromagnetic material may comprise from about 13 weight percent to about 30 weight percent of an amorphous thermoplastic resin; from about 3 weight percent to about 25 weight percent of aluminum oxide, boron nitride or aluminum silicate; and from about 45 weight percent to about 67 weight percent of iron oxide. Such composition provides a material density that is about three times the density of a standard plastic material used for toothbrushes, e.g. polypropylene. With the higher weight and higher thermal conductivity, the material drives the value perception, in particular in combination with a galvanic coating. Such coating may be made from real metal. The galvanic coating can be applied in a selective electroplating process. During this coating process for a multicomponent plastic part, a metallic layer is only deposited on a hard material while a further over molded soft component may remain unaffected.

The magnetic and/or ferromagnetic material may comprise about 27.5 weight percent of an amorphous thermoplastic resin, about 17 weight percent of aluminum oxide, about 51 weight percent of iron oxide, and about 4.5% glass fiber. The magnetic/ferromagnetic material of the handle possesses a relatively high density (about 2.5 g/cm$^3$), which is about three times the density of a standard plastic material used for toothbrushes, e.g. polypropylene (about 0.9 g/cm$^3$). The weight of said material is relatively high, which provides a user with a high-quality perception and comfortable feeling during use of the product.

The amorphous thermoplastic resin may comprise a styrene resin, e.g. styrene acrylonitrile "SAN". The amorphous thermoplastic resin may be selected from the list consisting of acrylonitrile butadiene styrene, polystyrene, and styrene acrylonitrile.

The amorphous thermoplastic resin may comprise about 17% weight percent styrene acrylonitrile, and 10.5 weight percent of a mixture comprising polybutylene terephthalate and polyethylene terephthalate.

Surprisingly, it has been found out that said composition provides a high gravity molding material appropriate for injection molding or extrusion molding. A high specific gravity molding material high in surface hardness, excellent in coating characteristics as well as excellent in thermal conductivity is provided.

The use of molding materials having a relatively high specific gravity is known. Such molding materials usually contain a polymeric resin and a high-density filler such as iron oxide. However, in such molding materials the amount of iron oxide which can be included is limited as the thermal conductivity properties of the molding material are relatively poor. Thus, on the one side, lower thermal conductivity leads to relatively longer cycle times during manufacturing to allow the molding material to cool after molding. On the other side, if heavy polymeric materials are filled with high heat conductive additives such as metal powder or fibers, the addition of these materials leads to tight process windows in molding because of the immediate freezing when the molten material contacts the cold wall of the tool. This fast freezing leads to high injection speed and low flow length to wall thickness ratio at the produced part.

Now, it has been surprisingly found out that the molding material according to the present disclosure has a high specific gravity and optimally controlled thermal conductivity properties to reduce or expand the time needed for the molding material to cool during or after injection molding. Surprisingly, it has been found out that a relatively high percentage of iron oxide can be maintained in the molding material while improving on the thermal conductivity properties of the molding material.

The addition to aluminum oxide, boron nitride or aluminum silicate may provide the molding material with improved thermal conductivity as compared to materials containing styrene resin and iron oxide only. This improved thermal conductivity may lead to lower cycle times as the molding material may take less time to cool after molding.

Another benefit from the addition of aluminum oxide, boron nitride or aluminum silicate to the material is the ability to increase the overall amount of iron oxide in the molding material as compared to iron oxide and resins of the past. The improvements in the molding material properties come from the addition of relatively small amounts of aluminum oxide, boron nitride or aluminum silicate. The material composition comprising a relatively high percentage of iron oxide (magnetite), i.e. from about 45 weight percent to about 67 weight percent, preferably about 51 weight percent, provides good magnetic properties and a relatively heavy weight of the overall material.

Styrene acrylonitrile "SAN" provides high thermal resistance properties. The acrylonitrile units in the chain enable SAN to have a glass transition temperature greater than 100° C. The properties of SAN may allow for reduced cycle time due to relatively earlier and quicker transition temperature. Amorphous polymers are suitable for heavy resin compounds of the present disclosure due to the glass transition temperature Tg at which an amorphous polymer is transformed, in a reversible way, from a viscous or rubbery condition to a hard one. By injection molding of the heavy resin material of the present disclosure, the temperature of the material melt is above the Tg region (viscous or rubbery condition). During cooling the compound attains the high Tg temperature early and reaches dimensional stability (glassy condition). Over-molding of the heavy resin material is possible as the material stays dimensional stable due to the high Tg of the material.

Polybutylene terephthalate and polyethylene terephthalate provides the handle with high quality surface properties, including improved optical characteristics, and high impact strength. Once heated, polybutylene terephthalate and polyethylene terephthalate represent a high temperature-resistant melt having low viscosity and a high Melt Flow Index (MFI). Therefore, processability of the magnetic/ferromagnetic material during molding is improved.

It is known, that heavy resin materials tend to show high shrinkage effects for products having thick walls/dimensions. However, it has been surprisingly found out that glass fibers added to the magentic/ferromagentic material provide the material composition with improved stability and low shrinkage effects.

The method for manufacturing an oral care implement according to the present disclosure comprises the following steps:
  providing an amorphous thermoplastic resin,
  providing aluminum oxide, boron nitride or aluminum silicate,
  providing iron oxide,
  mixing the amorphous thermoplastic resin, aluminum oxide, boron nitride or aluminum silicate and iron oxide into a magnetic and/or ferromagnetic molding material,
  heating the molding material mixture into a flowable molding material,
  molding the flowable molding mixture into a handle or part of a handle,
  providing a non-magnetic and/or non-ferromagnetic material, and
molding the non-magnetic and/or non-ferromagnetic material into a head or part of a head.

The amorphous thermoplastic resin may comprise styrene acrylonitrile, polybutylene terephthalate and polyethylene terephthalate, wherein polybutylene terephthalate and polyethylene terephthalate may be premixed with glass fibers. The amorphous thermoplastic resin/styrene acrylonitrile may be provided in a range from about 13 weight percent to about 30 weight percent; the aluminum oxide, boron nitride or aluminum silicate may be provided in a range from about 3 weight percent to about 25 weight percent; and the iron oxide may be provided in a range from about 45 weight percent to about 67 weight percent.

The magnetic and/or ferromagnetic material may comprise about 17 weight percent of styrene acrylonitrile; about 10.5 weight percent of a composition of polybutylene terephthalate and polyethylene terephthalate; about 4.5 weight percent of glass fibers; about 17 weight percent of aluminum oxide; and about 51 weight percent of iron oxide.

The material composition may be made by blending the amorphous thermoplastic resin with powder of aluminum oxide, boron nitride or aluminum silicate with iron oxide powder.

Increasing the amount of iron oxide within the material composition has further the advantage of providing a lower cost molding material as iron oxide powder is less expensive than the other filling agents. Amorphous thermoplastic resin, glass fibers, aluminum oxide, boron nitride or aluminum silicate powder and iron oxide powder may be blended by using a uniaxial extruder, a biaxial extruder, a kneader, a Banbury mixer, a roll or other such extruders. After blending, the material is heated to become flowable. The flowable material may then be molded into a handle or part of a handle by either injection molding or extrusion molding.

In an additional step, the handle or part of the handle may be electroplated to add improved appearance and a pleasant feel. Thermoplastic elastomers are well suited for electroplating as they allow for the creation of both hard and soft composite components to be electroplated selectively in one operation.

For example, the handle may comprise a thumb rest being made from a thermoplastic elastomer material and/or from a polypropylene material. These materials can be easily injection molded over the heavy resin material as discussed above. Such thumb rest may provide the handle with improved handling properties, e.g. with anti-slip properties to improve the maneuverability of the oral care implement under wet conditions, e.g. when the user brushes his teeth. The thumb rest may be made from thermoplastic elastomer material having a Shore A hardness from about 30 to about 60, or about 40 to prevent the oral care implement from being too slippery when used in wet conditions. At least a portion of the thumb rest may have a concave shape with an angle α with respect to the area of the remaining portion of the thumb rest from about 20° to about 25°, or about 24°. The thumb rest or a gripping region may be attached onto the front surface of the handle in the region close to the proximal end, i.e. closest to the head. The thumb rest may comprise a plurality of ribs extending substantially perpendicular to the longitudinal axis of the oral care implement. Such ribs may allow users/consumers to use the oral care implement with even more control. The user/consumer can better grasp and manipulate the handle of the oral care implement during brushing. Such handle may provide further improved control and greater comfort during brushing, in particular under wet conditions.

Furthermore, the handle may be made from at least two, or at least three different materials, each forming different parts of the handle. For example, a first material according to the present disclosure, i.e. a magnetic and/or ferromagnetic material may be injection molded into a first component of the handle thereby forming an underlying base structure of the oral care implement. A second component, e.g. of polypropylene material may be injection molded over the first component, and/or a third component, e.g. of thermoplastic elastomer material may be injection molded at least partially over the first component and/or the second component.

The third component of thermoplastic elastomer material may form the thumb rest on the front surface of the oral care implement and/or a palm grip on the back surface being opposite the front surface to be gripped by the user's/consumer's fingers and thumb. Such handle configuration may even further resist slippage during use. The thermoplastic elastomer material may extend through an aperture provided in the underlying base structure and/or second component of the handle.

The tooth cleaning elements of the oral care implement, e.g. bundle of filaments forming one or a plurality of tufts, may be attached to the head by means of a hot tufting process. One method of manufacturing the head with tufts of filaments embedded in the head may comprise the following steps: In a first step, tufts are formed by providing a desired amount of filaments. In a second step, the tufts are placed into a mold cavity so that ends of the filaments which are supposed to be attached to the head extend into said cavity. The opposite ends of the filaments not extending into said cavity may be either end-rounded or non-end-rounded. For example, the filaments may be not end-rounded in case the filaments are tapered filaments having a pointed tip. In a third step the head is formed around the ends of the filaments extending into the mold cavity by an injection molding process, thereby anchoring the tufts in the head. Alternatively, the tufts may be anchored by forming a first part of the head—a so called "sealplate"—around the ends of the filaments extending into the mold cavity by an injection molding process before the remaining part of the oral care implement is formed. Before starting the injection molding process the ends of the tufts extending into the mold cavity may be optionally melted or fusion-bonded to join the filaments together in a fused mass or ball so that the fused masses or balls are located within the cavity. The tufts may be held in the mold cavity by a mold bar having blind holes that correspond to the desired position of the tufts on the finished head of the oral care implement. In other words, the tufts attached to the head by means of a hot tufting process are not doubled over a middle portion along their length and are not mounted in the head by using an anchor/staple. The tufts are mounted on the head by means of an anchorfree tufting process.

Alternatively, the head for the oral care implement may be provided with a bristle carrier having at least one tuft hole, e.g. a blind-end bore. A tuft comprising a plurality of filaments may be fixed/anchored in said tuft hole by a stapling process/anchor tufting method. This means, that the filaments of the tuft are bent/folded around an anchor, e.g. an anchor wire or anchor plate, for example made of metal, in a substantially U-shaped manner. The filaments together with the anchor are pushed into the tuft hole so that the anchor penetrates into opposing side walls of the tuft hole thereby anchoring/fixing/fastening the filaments to the bristle carrier. The anchor may be fixed in opposing side walls by positive and frictional engagement. In case the tuft hole is a blind-end bore, the anchor holds the filaments against a bottom of the bore. In other words, the anchor may lie over the U-shaped bend in a substantially perpendicular manner Since the filaments of the tuft are bent around the anchor in a substantially U-shaped configuration, a first limb and a second limb of each filament extend from the bristle carrier in a filament direction. Filament types which can be used/are suitable for usage in a stapling process are also called "two-sided filaments". Heads for oral care implements which are manufactured by a stapling process can be provided in a relatively low-cost and time-efficient manner.

The following is a non-limiting discussion of example embodiments of oral care implements and parts thereof in accordance with the present disclosure, where reference to the Figures is made.

FIG. 1 shows an oral care implement 10, in this specific embodiment a manual toothbrush 10. The manual toothbrush 10 comprises a handle 12 and head 14, the head 14 being repeatedly attachable to and detachable from the handle 12. The handle 12 may be formed by using the process as shown in the flow chart of FIG. 3 and as further explained below. The handle 12 is molded from a magnetic and/or ferromagnetic material. In addition, the handle 12 may have been undergone electroplating with any additional material, for example a polyethylene material or a thermoplastic elastomer to create a soft region, e.g. a thumb rest 16. The soft region/thumb rest 16 may improve comfort and feel of the handle 12. Alternatively, or in addition, by a further electroplating step the handle 12 may be provided with a metal layer 18 directly on the magnetic and/or ferromagnetic material of the present disclosure to further improve the appearance of the handle 12. For example, the metal layer 18 may have the form of a ring surrounding the outer circumference 20 of the handle 12.

Figure 2:
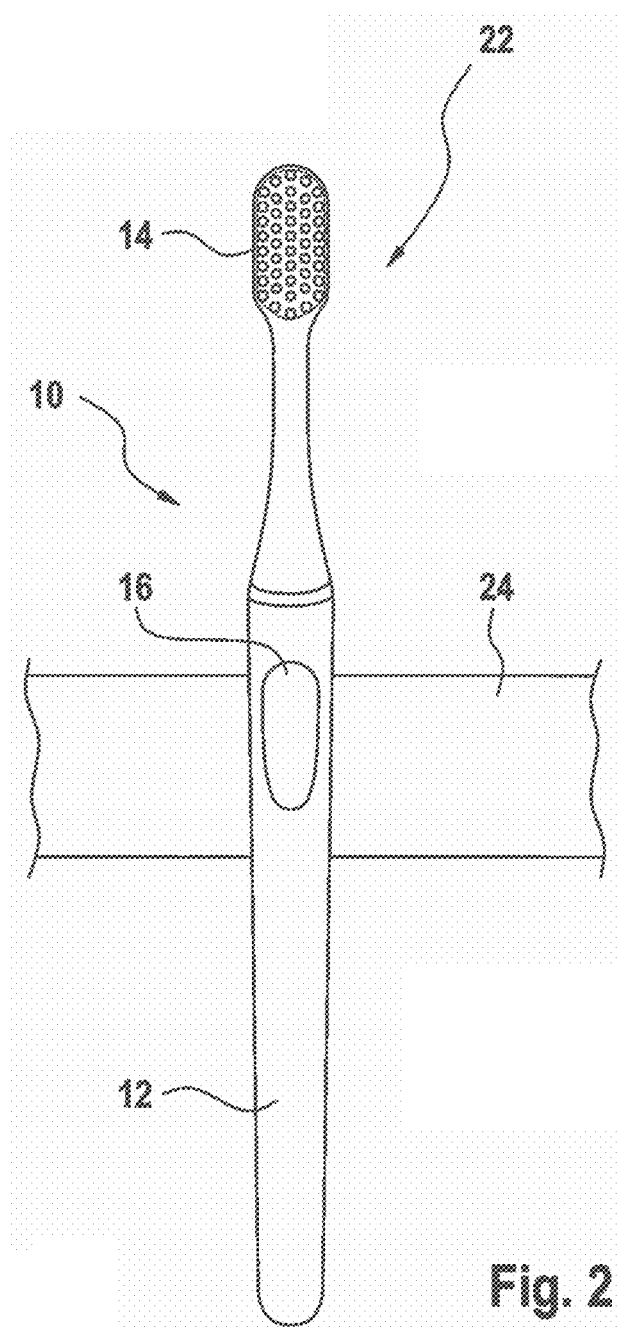
FIG. 2 shows a perspective view of an example embodiment of a kit comprising the oral care implement according to the present disclosure, and a magnetic holder at which the oral care implement is magnetically attached.

The material of which the handle 12 is at least partially made possesses magnetic and/or ferromagnetic properties. FIG. 2 shows a kit 22 comprising a manual toothbrush 10 with handle 12 to which head 14 is attached, and a magnetic holder 24 onto which toothbrush 10 is magnetically attached.

Figure 3:
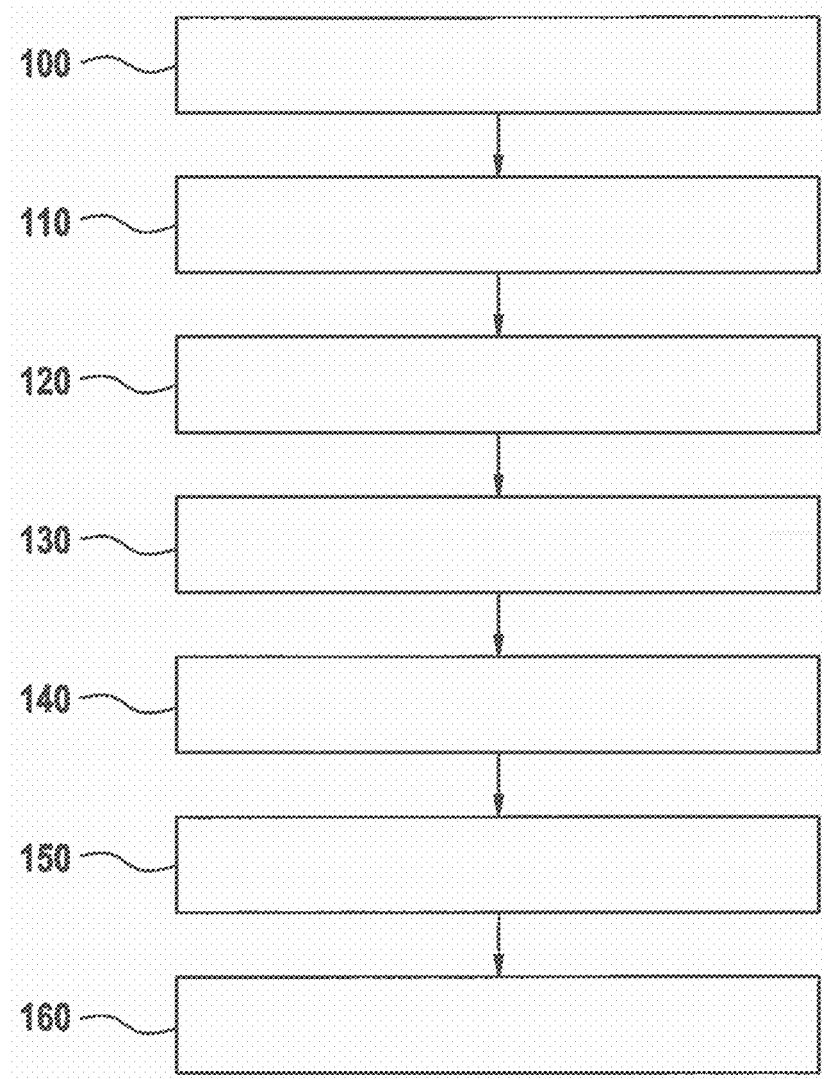
FIG. 3 shows a diagram of a flow chart for molding the handle of the oral care implement according to the present disclosure.

FIG. 3 shows a diagram of a flow chart illustrating the steps of making a handle 12 or a portion of a handle of the oral care implement 10 according to the present disclosure. An amorphous thermoplastic resin, optionally comprising glass fibers, is provided at 100. Aluminum oxide, boron nitride or aluminum silicate is provided at 110. Iron oxide is provided at 120. At 130, the amorphous thermoplastic resin (optionally comprising glass fibers), the aluminum oxide, boron nitride or aluminum silicate, and the iron oxide are mixed into a molding material. The molding material is then heated into a flowable condition at 140. The heated and flowable molding material is molded into a handle 12 or part of a handle at 150. The molding step may be either an injection molding or extrusion molding step. The optional step of electroplating the handle is shown at 160.

The material according to the present disclosure is an alternative to metal/zinc-die-cast material. The material of the disclosure enables to offer an attractive solution with respect to the manufacturing process according to the present disclosure, price and environment. This alternative allows the handle to have the look and feel in the final state like a metal product. At the same time the material of the present disclosure should be easily processable by injection molding and should save on the assembly effort. For example, for the process of the present disclosure there are three basic steps required: (1) injection molding of the handle 12; (2) two-component injection molding of hard material and/or soft material, e.g. to form a thumb rest 16; and (3) electroplating of the handle, e.g. to form a metal layer 18 in the form of a rin. In contrast, when using a zinc-die-cast material five steps are needed: (1) manufacturing of the zinc-die-casted main part; (2) deflashing of the main part; (3) electroplating the main part; (4) separately producing a soft material part; (5) and assembling the main part with the separately produced soft material part. A lubricant may be added to the material to improve the molding processing fluidity.

Table 1 shows the flowability and heat transfer results of several different formulas/material compositions:

TABLE 1

| | Flowability and heat transfer | | | |
|---|---|---|---|---|
| Test-No. | 20% SAN<br>80% Iron oxide | 20% SAN<br>5% Aluminum oxide<br>75% Iron oxide | 15% SAN<br>10% Aluminum oxide<br>75% Iron oxide | 17% SAN<br>16% Aluminum oxide<br>67% Iron oxide |
| Specific weight [g/cm$^3$] | 2.91 | 2.95 | 2.99 | 3.06 |
| 1 | 21 | 16 | 13 | 9 |
| 2 | 20 | 16 | 13 | 9 |
| 3 | 20 | 16 | 13 | 10 |
| 4 | 21 | 16 | 13 | 9 |
| 5 | 20 | 16 | 14 | 9 |
| 6 | 20 | 16 | 13 | 8 |
| 7 | 20 | 16 | 13 | 9 |
| 8 | 20 | 16 | 13 | 9 |
| 9 | 20 | 16 | 13 | 9 |
| 10 | 20 | 16 | 13 | 9 |
| Average (cm) | 20.2 | 16 | 13.1 | 9 |
| Content Al—Ox [%] | 0 | 5 | 10 | 16 |
| Heat transfer rate [W/m*K] | 0.87 | 0.96 | 1.2 | 1.43 |
| | 0.89 | 1.06 | 1.22 | 1.41 |
| | 0.88 | 1.01 | 1.23 | 1.44 |
| Average Value [W/m*K] | 0.88 | 1.01 | 1.21666667 | 1.42666667 |

Figure 4:
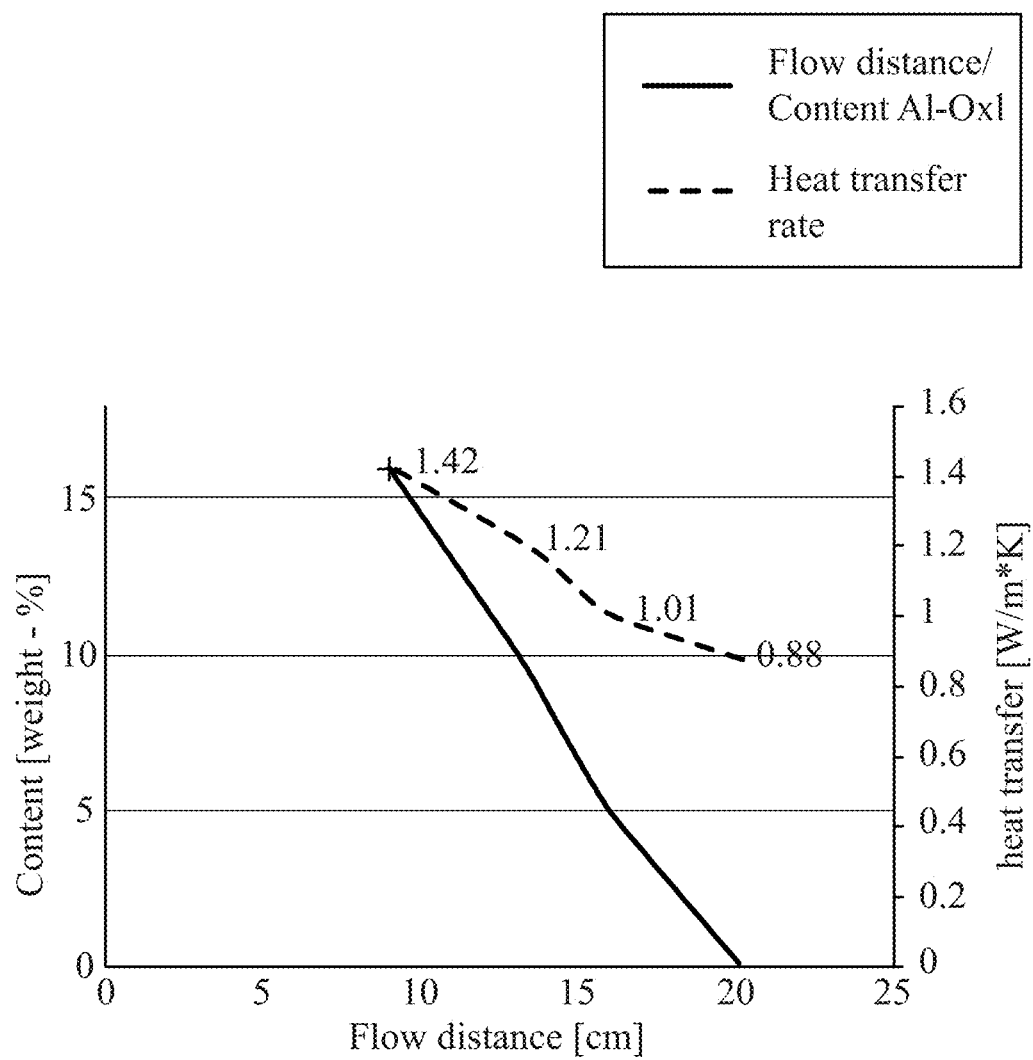
FIG. 4 is a graph showing average results of heat transfer and flow distance.

Graph 1, shown in FIG. 4, plots the average results of heat transfer and flow distance of the formulas from Table 1.

As can be seen, different fillers and different concentrations of fillers control the thermal conductivity or heat transmission and flowability of the material.

Test results revealed that the use of boron nitride or aluminum silicate showed very similar results to that of aluminum oxide depicted in Table 1 and Graph 1.

The heat energy and shear heating affect the fluidity of the heavy resin material, and thereby the process window for an effective injection molding process can be exactly controlled. Further, with the ability of the material of the present disclosure to fill any available cavities within the mold, it is possible to use the mass/weight distribution of the material for adaption of the inertial moment of the finished handle.

There are several advantages with the material of the present disclosure: The handle manufactured with the material of the present disclosure looks and feels like a heavy metal handle and it is resistant to corrosion. The material also has manufacturing advantages and cost saving advantages with fast cycle times due to its heat transfer properties as compared to metal inserted or die-casted handles and products with assembled component parts. The material of the present disclosure requires less energy and other essential resources for manufacturing in comparison to zinc-die casted products.

In contrast to material compositions that are highly loaded with fillers, the magnetic/ferromagnetic material of the present disclosure shows optimized mechanical properties, in particular dimensional stability under heat and impact strength due to the improved melt viscosity and glass transition temperature.

The material of the present disclosure possesses the ability to adhere to other components/materials, e.g., substrates and resins, which is important for multicomponent injection molding, e.g. for molding handles comprising two or three different materials.

In the context of this disclosure, the term "substantially" refers to an arrangement of elements or features that, while in theory would be expected to exhibit exact correspondence or behavior, may, in practice embody something slightly less than exact. As such, the term denotes the degree by which a quantitative value, measurement or other related representation may vary from a stated reference without resulting in a change in the basic function of the subject matter at issue.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

What is claimed is:

1. An oral care implement (10) comprising a head (14) and a handle (12), the head (14) being repeatedly attachable to and detachable from the handle (12), the head (14) being made from a non-magnetic and/or non-ferromagnetic material, and the handle (12) being at least partially made from a magnetic and/or ferromagnetic material,
   wherein the magnetic and/or ferromagnetic material comprises from about 13 weight percent to about 30 weight percent of an amorphous thermoplastic resin, from about 3 weight percent to about 25 weight percent of aluminum oxide, boron nitride or aluminum silicate; and from about 45 weight percent to about 67 weight percent of iron oxide,
   wherein the amorphous thermoplastic resin comprises about 17% weight percent styrene acrylonitrile, and 10.5 weight percent of a mixture comprising polybutylene terephthalate and polyethylene terephthalate.

2. The oral care implement (10) of claim 1, wherein the handle (14) comprises a thumb rest (16) being made from thermoplastic elastomer material and/or from polypropylene material.

3. The oral care implement (10) of claim 1, wherein the oral care implement (10) is a manual toothbrush (10).

4. The oral care implement (10) of claim 1, wherein the handle (12) is formed of at least two different parts (12, 16, 18) made of different materials.

5. A kit (22) comprising the oral care implement (10) of claim 1 and a magnetic holder (24) for attaching and holding the oral care implement (10).

6. A method for manufacturing an oral care implement (10) of claim 1, the method comprising steps:
   providing an amorphous thermoplastic resin;
   providing aluminum oxide, boron nitride or aluminum silicate;
   providing iron oxide;
   mixing the amorphous thermoplastic resin, aluminum oxide, boron nitride or aluminum silicate and iron oxide into a magnetic and/or ferromagnetic molding material;
   heating the molding material mixture into a flowable molding material;
   molding the flowable molding mixture into a handle (12) or part of a handle (12);
   providing a non-magnetic and/or non-ferromagnetic material; and
   molding the non-magnetic and/or non-ferromagnetic material into a head (14) or part of a head (14),
      wherein the amorphous thermoplastic resin is provided in a range from about 13 weight percent to about 30 weight percent; the aluminum oxide, boron nitride or aluminum silicate is provided in a range from about 3 weight percent to about 25 weight percent; and the iron oxide is provided in a range from about 45 weight percent to about 67 weight percent.

7. The method of claim 6, wherein the amorphous thermoplastic resin comprises at least one of styrene acrylonitrile, polybutylene terephthalate and polyethylene terephthalate.

8. The method of claim 6, wherein at least a portion of the amorphous thermoplastic resin is blended with glass fiber.

9. The method of claim 6, comprising a step of electroplating the handle (12) with a thermoplastic elastomer or a polypropylene material.

10. The method of claim 6, wherein the head (14) and/or handle (12) is molded by injection molding or extrusion molding.

* * * * *